Dec. 26, 1961 W. T. MADEIRA 3,014,610
MOLDING CLIP INSTALLING TOOL
Filed Jan. 12, 1960
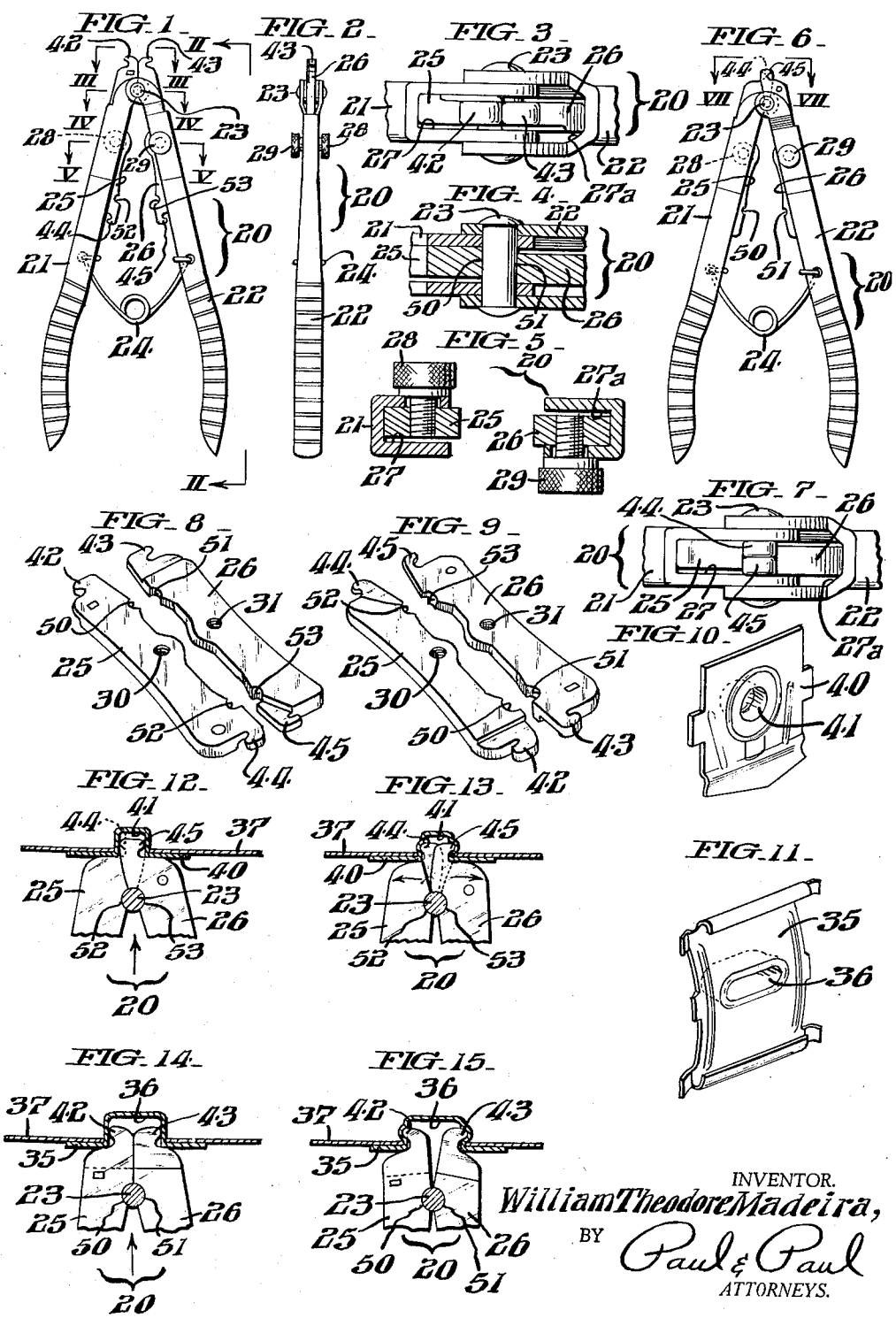
INVENTOR.
William Theodore Madeira,
BY Paul & Paul
ATTORNEYS.

3,014,610
MOLDING CLIP INSTALLING TOOL
William Theodore Madeira, Lancaster, Pa., assignor to K-D Manufacturing Company, Lancaster, Pa., a corporation of Pennsylvania
Filed Jan. 12, 1960, Ser. No. 1,997
3 Claims. (Cl. 218—39)

This invention relates to a pliers-type tool particularly adapted for installing molding clips, in automobile bodies and the like.

My invention will become clear from a consideration of the following description of a preferred embodiment as illustrated in the drawing in which:

FIG. 1 is a top view of a molding-clip installing tool embodying my present invention showing one pair of jaw inserts in place for use in installing a molding clip of the type shown in FIG. 11;

FIG. 2 is a side view looking along the lines II—II of FIG. 1;

FIG. 3 is an end view looking along the line III—III of FIG. 1;

FIG. 4 is a view, partly in cross section, along the line IV—IV of FIG. 1;

FIG. 5 is a view, partly in cross section, along the line V—V of FIG. 1;

FIG. 6 is a top view of a molding-clip installing tool embodying the present invention showing the pair of jaw inserts in place but with opposite ends thereof exposed at the front end of the tool for use in installing a molding clip of the type shown in FIG. 10;

FIG. 7 is an end view along the line VII—VII of FIG. 6;

FIG. 8 is an illustration of a pair of reversible jaw inserts shown in position for insertion in the lever arms of the pliers to produce the result illustrated in FIG. 1;

FIG. 9 is the same pair of jaw inserts as shown in FIG. 8, but reversed in position for insertion in the lever arms of the pliers to produce the result illustrated in FIG. 6;

FIG. 10 illustrates one form of clip which may be readily installed by the installing tool of FIG. 6, such installation being illustrated in FIGS. 12 and 13; and FIG. 11 is another type of clip which is installed by the installing tool when in the form shown in FIG. 1, such installation being illustrated in FIGS. 14 and 15.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to the drawing, there is shown in FIGS. 1, 2 and 6 a plier-type tool 20 comprising lever arms 21 and 22 pivotally connected by a pivot pin or rivet 23 and normally held spread by a spring 24.

In FIGS. 8 and 9 is shown a pair of reversible jaw inserts adapted for insertion in the lever arms 21, 22 of FIGS. 1, 2 and 6 thereby to form a pliers-type tool particularly adapted for installing molding clips of the types illustrated in FIGS. 10 and 11. As shown in FIGS. 8 and 9, the jaw inserts according to the present invention are elongated bars each having a centrally positioned threaded hole 30, 31, and each having a half-round recess 50, 51 and 52, 53 located on the inside edge of the insert between the centrally positioned hole and each end of the insert. It will be seen that opposite ends of each ends of each insert are shaped differently so that together the inserts form pairs of jaws of different configurations.

In FIG. 8, the jaw inserts 25, 26 are shown in position for insertion in the handles 21, 22 to provide a molding clip installation tool having a pair of jaws 42, 43 aligned end-to-end as illustrated in FIGS. 1 and 3. In FIG. 9, the same jaw inserts, 25, 26 are shown in position for insertion in the lever arms 21, 22 to form a molding clip installation tool having a pair of jaws 44, 45 side-by-side as illustrated in FIGS. 6 and 7.

As seen in FIGS. 3 and 7, the lever arms 21, 22 are provided at their pivot ends with slots 27, 27a, for receiving the jaw inserts 25, 26. To install the inserts 25, 26, each insert is pushed outwardly through the slot 27, or 27a from within the lever arms until the half-round recess at the exposed end of the insert embraces the shaft of the rivet 23 at which time one of the threaded holes 30, 31 is in line with a corresponding unthreaded hole in the lever arm. Each insert may then be secured to one of the lever arms 21, 22 as by thumb screws 28, 29 inserted through the unthreaded holes in the lever arms and into the threaded holes 30, 31 provided in the jaw clips, as illustrated in FIGS. 1, 2, 5 and 6. It will be understood that in FIGS. 8 and 9, the left end of the jaw inserts (as viewed in FIGS. 8 and 9) protrudes through the slots 27, 27a of lever arms 21, 22 in FIGS. 1 and 2, respectively.

The half-round recesses 50, 51 and 52, 53 serve two important purposes. First, as described above, they embrace the shaft of the rivet 23 and by so doing assist in properly locating the insert in the lever arms. Second, during operation of the pliers, when the pliers handles are pressed together, the half-round recesses serve as bearing surfaces for the rivet 23, the rivet 23 functioning as the fulcrum of the inserts 25, 26. This is clearly seen in FIGS. 12, 13 and 14, 15.

For the convenience of the operator, there is placed on one side of each insert at each end a marker (a rectangle and a circle) to identify the different ends of the insert.

When the inserts are installed so that the tips are in the jaw abutting or back-to-back position shown in FIG. 1 and FIG. 3, the installation tool 20 is particularly adapted for installing a molding clip 35 of the type shown in FIG. 11, commonly employed in automobile bodies. It will be seen that clip 35 is provided with a centrally located elongated cup or well 36 which, during installation, is inserted in a slot in the car body 37, as seen in FIG. 14. The jaws 42, 43 of the molding clip tool of FIG. 1 are then inserted into the well 36 and are spread in the manner illustrated in FIG. 15 to bulge the side walls of the well 36. In accordance with my present invention, the jaw tips are shaped as illustrated so that the side walls of the well 36 are cammed outwardly to form the bulge on either side without tearing or rupture of the well wall, thereby to secure the clip 35 in the car body 37.

When jaw inserts 25, 26 are inserted in lever arms 21, 22 in the position illustrated in FIG. 9, (with the left ends of the inserts as viewed in FIG. 9 protruding through the slots 27, 27a), the molding clip tool 20 takes the form illustrated in FIG. 6 in which the jaw tips are side-by-side rather then back-to-back as in the case of FIG. 1. This side-by-side position of the jaw tips is shown in detail in FIG. 7.

When the jaw inserts are inserted in the lever arms so that the jaws 44, 45 are in the side-by-side positions illustrated in FIGS. 9, 6 and 7, the installation tool is adapted to install the molding clip 40 of the type shown in FIG. 10. Clip 40 is characterized by having a centrally positioned circular cup or well 41 which is inserted in a hole in the car body 37, in the manner illustrated in FIG. 12. The side-by-side jaw tips 44, 45 of the tool of FIG. 6 are inserted into the cup 41 as shown in FIG. 12 and are then spread as illustrated in FIG.

13. As in the case of tips 42, 43, the tips 44, 45 are designed to exert a camming action against the sides of the cup 41 thereby to accomplish bulging of the sides of the cup without tearing. In this manner, the clip 40 is firmly secured to the car body 37.

While the preferred embodiment of my invention has been described in some detail, it will be obvious to one skilled in the art that various modifications may be made without departing from the invention as hereinafter claimed.

Having thus described my invention, I claim:

1. A pliers-type installation tool for installing molding clips and the like, said tool comprising a pair of lever arms pivotally connected at one end thereof by a pivot pin, each of said lever arms being provided at the pivot end with a through slot; a pair of reversible bar inserts, each end of such bar being provided with a tip of different configuration, each bar having along one edge thereof a pair of half-round recesses, one at each end portion of said bar; means for securing one of said reversible bars in each of said lever arms in such position that an end portion of said bar protrudes through said slot with one of said half-round recesses embracing said pivot pin, the tips of the protruding ends of the two bars cooperating to form a pair of jaws adapted for spreading the cup of the molding clip.

2. A pliers-type installation tool as claimed in claim 1 characterized in that the jaw tip configuration is rounded so as to provide a camming action on the walls of the molding clip cup.

3. A pliers-type installation tool for installing molding clips and the like, said tool comprising a pair of lever arms pivotally connected at one end thereof by a pin, each of said lever arms being provided at the pivot end with a through slot; a pair of reversible bar inserts, each end of such bar being provided with a tip of different configuration, each bar having along one edge a pair of half-round recesses one located in each end portion; means for securing each of said reversible bars, one in each of said lever arms, in such positions that one end portion of each bar protrudes through the said slots with the half-round recess at that end portion embracing said pivot pin, the tips of the two protruding ends of the two secured bars cooperating to form a pair of jaws adapted for spreading the cup of the molding clip, the half-round recess in each bar functioning as a bearing surface on the pivot pin, the pivot pin functioning as the fulcrum for the bar inserts and lever arms.

References Cited in the file of this patent

UNITED STATES PATENTS

| | | |
|---|---|---|
| 1,174,132 | Dragun | Mar. 7, 1916 |
| 1,750,121 | Ottinger | Mar. 11, 1930 |
| 2,227,290 | Wiley | Dec. 31, 1940 |
| 2,324,468 | Brickman | July 20, 1943 |
| 2,745,177 | Kortick | May 15, 1956 |

FOREIGN PATENTS

| | | |
|---|---|---|
| 22,206 | Great Britain | Oct. 8, 1907 |
| 92,201 | Switzerland | Dec. 16, 1921 |